United States Patent
Khdour et al.

(10) Patent No.: US 12,459,910 B2
(45) Date of Patent: Nov. 4, 2025

(54) MITOCHONDRIAL THERAPEUTIC AGENTS (71) Applicant: ARIZONA BOARD OF REGENTS ON BEHALF OF ARIZONA STATE UNIVERSITY, Scottsdale, AZ (US)

(72) Inventors: Omar Khdour, Phoenix, AZ (US); Sidney Hecht, Phoenix, AZ (US); Jun Liu, Scottsdale, AZ (US); Indrajit Bandyopadhyay, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/691,696

(22) PCT Filed: Sep. 14, 2021

(86) PCT No.: PCT/US2021/050306
§ 371 (c)(1),
(2) Date: Mar. 13, 2024

(87) PCT Pub. No.: WO2023/043432
PCT Pub. Date: Mar. 23, 2023

(65) Prior Publication Data
US 2024/0409521 A1 Dec. 12, 2024

(51) Int. Cl.
C07D 279/20 (2006.01)
A61K 31/5415 (2006.01)
(52) U.S. Cl.
CPC ........ C07D 279/20 (2013.01); A61K 31/5415 (2013.01)
(58) Field of Classification Search
None
See application file for complete search history.

(56) References Cited

U.S. PATENT DOCUMENTS

| | | |
|---|---|---|
| 2012/0238543 A1 | 9/2012 | Hurt et al. |
| 2016/0039776 A1 | 2/2016 | Hinman et al. |
| 2016/0228491 A1 | 8/2016 | Wilson |

OTHER PUBLICATIONS

Atamna, H , et al., "Combined activation of the energy and cellular-defense pathways may explain the potent anti-senescence activity of methylene blue", Redox Biology 6, 426-435 (2015).
Atamna, H , et al., "Methylene blue delays cellular senescence and enhances key mitochondrial biochemical pathways", Faseb J 22(3), 703-712 (2008, available online 2007).
Chowdhury, S , et al., "Lipophilic methylene violet analogues as modulators of mitochondrial function and dysfunction", Bioorganic & Medicinal Chemistry 25, 5537-5547 (2017).
Coppola, G, et al., "Functional genomic analysis of frataxin deficiency reveals tissue-specific alterations and identifies the PPARγ pathway as a therapeutic target in Friedreich's ataxia", Human Molecular Genetics 18 (13), 2452-2461 (2009).
Dimauro , et al., "Mitochondrial DNA mutations in human disease", Am. J. Med Genet. 106(1), 18-26 (2001).
Jasoliya, M , et al., "Frataxin deficiency impairs mitochondrial biogenesis in cells, mice and humans", Human Molecular Genetics 26 (14), 2627-2633 (2017).
Karamanlidis, G , et al., "Mitochondrial Complex I Deficiency Increases Protein Acetylation and Accelerates Heart Failure", Cell Metabolism 18, 239-250 (2013).
Khdour, M , et al., "Phenothiazine antioxidants increase mitochondrial biogenesis and frataxin levels in Friedreich's ataxia cells", Med Chem Commun 9, 1491-1501, (2018).
Leonard, J , et al., "Mitochondrial respiratory chain disorders I: mitochondrial DNA defects", Lancet 355(9200), 299-304 (2000).
Liu, J , et al., "Antiferroptotic Activity of Phenothiazine Analogues: A Novel Therapeutic Strategy for Oxidative Stress Related Disease", ACS Med Chem Lett 11, 2165-2173 (2020).
Marmolino, D, et al., "PGC-1alpha Down-Regulation Affects the Antioxidant Response in Friedreich's Ataxia", PLoS One 5 (4), e10025, doi:10.1371/journal.pone.0010025, 11 pages (2010).
Mayevsky, A , et al., "Mitochondrial function in vivo evaluated by NADH fluorescence: from animal models to human studies", Am J Physiol Cell Physiol 292, C615-C640 (2007).
Patent Cooperation Treaty , International Search Report and Written Opinion for PCT/US2021/050306, 8 pages, dated Dec. 28, 2021.
Paupe, V , et al., "Impaired Nuclear Nrf2 Translocation Undermines the Oxidative Stress Response in Friedreich Ataxia", PLoS One 4 (1): e4253, doi:10.1371/journal.pone.0004253, 11 pages (2009).
PUBCHEM , CID 68227008, 8 pages (Nov. 30, 2012).
Sahdeo, S , et al., "Dyclonine rescues frataxin deficiency in animal models and buccal cells of patients with Friedreich's ataxia", Human Molecular Genetics, doi:10.1093/hmg/ddu408, 1-15 (2014).

(Continued)

*Primary Examiner* — Leslie A. Royds Draper
(74) *Attorney, Agent, or Firm* — Viksnins Harris Padys Malen LLP (57) ABSTRACT

The invention provides a compound of formula (I): or a pharmaceutically acceptable salt thereof, wherein $R^1$ has any of the values described in the specification, as well as compositions comprising a compound of formula (I). The compounds are useful as cytoprotective agents.

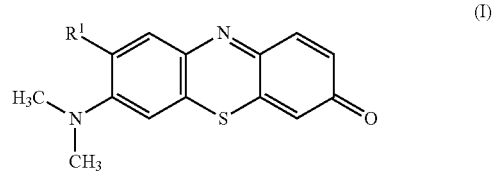

20 Claims, 4 Drawing Sheets (56) References Cited

OTHER PUBLICATIONS

Santoro, A., et al., "Effect of diazoxide on Friedreich ataxia models", Human Molecular Genetics 27 (6), 992-1001 (2018).
Shan, Y., et al., "Frataxin Deficiency Leads to Defects in Expression of Antioxidants and Nrf2 Expression in Dorsal Root Ganglia of the Friedreich's Ataxia YG8R Mouse Model", Antioxidants & Dedox Signaling 19 (13), 1481-1493 (2013).
Stack, C., et al., "Methylene blue upregulates Nrf2/ARE genes and prevents tau-related neurotoxicity", Human Molecular Genetics 23 (14), 3716-3732 (2014).
Wagner, G., et al., "Friedreich's ataxia reveals a mechanism for coordinate regulation of oxidative metabolism via feedback inhibition of the SIRT3 deacetylase", Human Molecular Genetics 21 (12), 2688-2697 (2012).
Wen, Y., et al., "Alternative Mitochondrial Electron Transfer as a Novel Strategy for Neuroprotection", The Journal of Biological Chemistry 286(18), 16504-16515 (2011).

MITOCHONDRIAL THERAPEUTIC AGENTS

CROSS-REFERENCE TO RELATED APPLICATION(S)

This patent application is a 35 U.S.C. § 371 application of International Application Serial No. PCT/US2021/050306, filed Sep. 14, 2021, which application is herein incorporated by reference.

BACKGROUND OF THE INVENTION

Mitochondria are intracellular organelles responsible for a number of metabolic transformations and regulatory functions. They produce much of the ATP employed by eukaryotic cells. They are also the major source of free radicals and reactive oxygen species that cause oxidative stress. Consequently, mitochondrial defects are damaging, particularly to neural and muscle tissues which have high energy level demands. Thus, energetic defects have been implicated in forms of movement disorders, cardiomyopathy, myopathy, blindness, and deafness (DiMauro et al. (2001) *Am. J. Med. Genet.* 106, 18-26; Leonard et al. (2000) *Lancet.* 355, 299-304). There are a number of mitochondrial diseases resulting from both nuclear and mitochondrial genetic defects, and the underlying biochemistries of these diseases tend to be rather similar. They include increased lactate production, diminished respiration and ATP production, and reflect the consequences of oxidative stress. Mitochondrial dysfunction is linked to numerous neurodegenerative diseases including Alzheimer's disease, Parkinson's disease, Huntington's disease, and Friedreich's ataxia.

Currently there is a need for agents that are useful for the treatment or suppression of diseases associated with decreased mitochondrial function resulting in diminished ATP production and/or oxidative stress and/or lipid peroxidation.

SUMMARY OF THE INVENTION

Provided are compounds that confer cytoprotection and quenched ROS and lipid peroxidation in a dose-dependent manner in Friedreich's ataxia (FRDA) lymphocytes at low micromolar concentrations. Also provided are compounds that prevent ROS-induced damage of cellular lipid membranes and maintain the mitochondrial membrane potential of FRDA lymphocytes. In addition, the compounds significantly increased frataxin levels. The disclosure also describes use of these compounds for the treatment of mitochondrial disorders, including but not limited to Friedreich's ataxia, Leber's Hereditary Optic Neuropathy, Kearns-Sayre Syndrome, Mitochondrial Encephalomyopathy with Lactic Acidosis and Stroke-Like Episodes and more generally, any disease associated with impairment of energy production and mitochondrial function. Aging may also involve decreased mitochondrial function and diminished ATP production, and the therapeutic agents described here may also find utility in mitigating the effects of aging.

In one aspect the present invention provides a compound of formula (I):

(I)

or a pharmaceutically acceptable salt thereof, wherein. $R^1$ is $C_2$-$C_{20}$ alkyl optionally substituted with one or more halo.

The invention also provides a pharmaceutical composition comprising a compound of formula I or a pharmaceutically acceptable salt thereof, and a pharmaceutically acceptable excipient.

The invention also provides a method for treating or preventing treating or suppressing diseases associated with decreased mitochondrial function resulting in diminished ATP production and/or oxidative stress and/or lipid peroxidation, comprising administering an effective amount of the compound and salts of the disclosure in an animal (e.g., a mammal such as a human) comprising administering a compound of formula I or a pharmaceutically acceptable salt thereof to the animal.

The invention also provides a method for treating or suppressing one or more of Friedreich's ataxia, Leber's Hereditary Optic Neuropathy, Kearns-Sayre Syndrome, Mitochondrial Encephalomyopathy with Lactic Acidosis and Stroke-Like Episodes, or Leigh syndrome, comprising administering an effective amount of the compound and salts of the disclosure in an animal (e.g., a mammal such as a human) comprising administering a compound of formula I or a pharmaceutically acceptable salt thereof to the animal.

The invention also provides a method for treating or suppressing one or more of obesity, atherosclerosis, amyotrophic lateral sclerosis, Parkinson's Disease, cancer, heart failure, myocardial infarction (MI), Alzheimer's Disease, Huntington's Disease, schizophrenia, bipolar disorder, fragile X syndrome, chronic fatigue syndrome, and Leigh syndrome, comprising administering an effective amount of the compound and salts of the disclosure in an animal (e.g., a mammal such as a human) comprising administering a compound of formula I or a pharmaceutically acceptable salt thereof to the animal.

The invention also provides a compound of formula I or a pharmaceutically acceptable salt thereof for use in medical therapy.

The invention also provides a compound of formula I or a pharmaceutically acceptable salt thereof for the prophylactic or therapeutic treatment of a disease associated with decreased mitochondrial function resulting in diminished ATP production and/or oxidative stress and/or lipid peroxidation.

The invention also provides a compound of formula I or a pharmaceutically acceptable salt thereof for the prophylactic or therapeutic treatment of one or more of Friedreich's ataxia, Leber's Hereditary Optic Neuropathy, Kearns-Sayre Syndrome, Mitochondrial Encephalomyopathy with Lactic Acidosis and Stroke-Like Episodes, or Leigh syndrome.

The invention also provides a compound of formula I or a pharmaceutically acceptable salt thereof for the prophylactic or therapeutic treatment of one or more of obesity, atherosclerosis, amyotrophic lateral sclerosis, Parkinson's Disease, cancer, heart failure, myocardial infarction (MI), Alzheimer's Disease, Huntington's Disease, schizophrenia, bipolar disorder, fragile X syndrome, chronic fatigue syndrome, and Leigh syndrome.

The invention also provides the use of a compound of formula I or a pharmaceutically acceptable salt thereof to prepare a medicament for treating a disease associated with decreased mitochondrial function resulting in diminished ATP production and/or oxidative stress and/or lipid peroxidation in an animal (e.g. a mammal such as a human).

The invention also provides the use of a compound of formula I or a pharmaceutically acceptable salt thereof to prepare a medicament for treating Friedreich's ataxia, Leber's Hereditary Optic Neuropathy, Kearns-Sayre Syndrome, Mitochondrial Encephalomyopathy with Lactic Acidosis and Stroke-Like Episodes, or Leigh syndrome in an animal (e.g. a mammal such as a human).

The invention also provides the use of a compound of formula I or a pharmaceutically acceptable salt thereof to prepare a medicament for treating obesity, atherosclerosis, amyotrophic lateral sclerosis, Parkinson's Disease, cancer, heart failure, myocardial infarction (MI), Alzheimer's Disease, Huntington's Disease, schizophrenia, bipolar disorder, fragile X syndrome, chronic fatigue syndrome, and Leigh syndrome in an animal (e.g. a mammal such as a human).

The invention also provides processes and intermediates disclosed herein that are useful for preparing a compound of formula I or a salt thereof.

BRIEF DESCRIPTION OF THE FIGURES

FIGS. 4A-4C. Shows the effect of representative compounds on AMPK and p-AMPK protein expression and their potential as AMPK-mediated inhibitors of ferroptosis.

DETAILED DESCRIPTION OF THE INVENTION

The following definitions are used, unless otherwise described: halo or halogen is fluoro, chloro, bromo, or iodo. Alkyl denotes both straight and branched groups; but reference to an individual radical such as propyl embraces only the straight chain radical, a branched chain isomer such as isopropyl being specifically referred to.

As used herein, the term "protecting group" refers to a substituent that is commonly employed to block or protect a particular functional group on a compound. For example, an "amino-protecting group" is a substituent attached to an amino group that blocks or protects the amino functionality in the compound. Suitable amino-protecting groups include acetyl, trifluoroacetyl, t-butoxycarbonyl (BOC), benzyloxycarbonyl (CBZ) and 9-fluorenylmethylenoxycarbonyl (Fmoc). Similarly, a "hydroxy-protecting group" refers to a substituent of a hydroxy group that blocks or protects the hydroxy functionality. Suitable protecting groups include acetyl and silyl. A "carboxy-protecting group" refers to a substituent of the carboxy group that blocks or protects the carboxy functionality. Common carboxy-protecting groups include phenylsulfonylethyl, cyanoethyl, 2-(trimethylsilyl) ethyl, 2-(trimethylsilyl)ethoxymethyl, 2-(p-toluenesulfonyl) ethyl, 2-(p-nitrophenylsulfenyl)ethyl, 2-(diphenylphosphino)-ethyl, nitroethyl and the like. For a general description of protecting groups and their use, see P. G. M. Wuts and T. W. Greene, Greene's Protective Groups in Organic Synthesis, 4' edition, Wiley-Interscience, New York, 2006.

As used herein a wavy line "∿" that intersects a bond in a chemical structure indicates the point of attachment of the bond that the wavy bond intersects in the chemical structure to the remainder of a molecule.

The terms "treat", "treatment", or "treating" to the extent it relates to a disease or condition includes inhibiting the disease or condition, eliminating the disease or condition, and/or relieving one or more symptoms of the disease or condition. The terms "treat", "treatment", or "treating" also refer to both therapeutic treatment and/or prophylactic treatment or preventative measures, wherein the object is to prevent or slow down (lessen) an undesired physiological change or disorder, such as, for example, the development or spread of cancer. For example, beneficial or desired clinical results include, but are not limited to, alleviation of symptoms, diminishment of extent of disease or disorder, stabilized (i.e., not worsening) state of disease or disorder, delay or slowing of disease progression, amelioration or palliation of the disease state or disorder, and remission (whether partial or total), whether detectable or undetectable. "Treat", "treatment", or "treating," can also mean prolonging survival as compared to expected survival if not receiving treatment. Those in need of treatment include those already with the disease or disorder as well as those prone to have the disease or disorder or those in which the disease or disorder is to be prevented. In one embodiment "treat", "treatment", or "treating" does not include preventing or prevention, The phrase "therapeutically effective amount" or "effective amount" includes but is not limited to an amount of a compound of the that (i) treats or prevents the particular disease, condition, or disorder, (ii) attenuates, ameliorates, or eliminates one or more symptoms of the particular disease, condition, or disorder, or (iii) prevents or delays the onset of one or more symptoms of the particular disease, condition, or disorder described herein.

The term "mammal" as used herein refers to humans, higher non-human primates, rodents, domestic, cows, horses, pigs, sheep, dogs and cats. In one embodiment, the mammal is a human. The term "patient" as used herein refers to any animal including mammals. In one embodiment, the patient is a mammalian patient. In one embodiment, the patient is a human patient.

The compounds disclosed herein can also exist as tautomeric isomers in certain cases. Although only one delocalized resonance structure may be depicted, all such forms are contemplated within the scope of the invention.

It is understood by one skilled in the art that this invention also includes any compound claimed that may be enriched at any or all atoms above naturally occurring isotopic ratios with one or more isotopes such as, but not limited to, deuterium ($^2H$ or D). As a non-limiting example, a —$CH_3$ group may be substituted with —$CD_3$.

The pharmaceutical compositions of the invention can comprise one or more excipients. When used in combination with the pharmaceutical compositions of the invention the term "excipients" refers generally to an additional ingredient that is combined with the compound of formula (I) or the pharmaceutically acceptable salt thereof to provide a corresponding composition. For example, when used in combination with the pharmaceutical compositions of the invention the term "excipients" includes, but is not limited to: carriers, binders, disintegrating agents, lubricants, sweetening agents, flavoring agents, coatings, preservatives, and dyes.

Stereochemical definitions and conventions used herein generally follow S. P. Parker, Ed., McGraw-Hill Dictionary of Chemical Terms (1984) McGraw-Hill Book Company, New York; and Eliel, E. and Wilen, S., "Stereochemistry of Organic Compounds", John Wiley & Sons, Inc., New York, 1994. The compounds of the invention can contain asymmetric or chiral centers, and therefore exist in different stereoisomeric forms. It is intended that all stereoisomeric forms of the compounds of the invention, including but not limited to, diastereomers, enantiomers and atropisomers, as well as mixtures thereof such as racemic mixtures, form part of the present invention. Many organic compounds exist in optically active forms, i.e., they have the ability to rotate the plane of plane-polarized light. In describing an optically active compound, the prefixes D and L, or R and S, are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. For a given chemical structure, these stereoisomers are identical except that they are mirror images of one another. A specific stereoisomer can also be referred to as an enantiomer, and a mixture of such isomers is often called an enantiomeric mixture. A 50:50 mixture of enantiomers is referred to as a racemic mixture or a racemate, which can occur where there has been no stereoselection or stereospecificity in a chemical reaction or process. The terms "racemic mixture" and "racemate" refer to an equimolar mixture of two enantiomeric species, devoid of optical activity.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase.

When a bond in a compound formula herein is drawn in a non-stereochemical manner (e.g. flat), the atom to which the bond is attached includes all stereochemical possibilities. When a bond in a compound formula herein is drawn in a defined stereochemical manner (e.g. bold, bold-wedge, dashed or dashed-wedge), it is to be understood that the atom to which the stereochemical bond is attached is enriched in the absolute stereoisomer depicted unless otherwise noted. In one embodiment, the compound may be at least 51% the absolute stereoisomer depicted. In another embodiment, the compound may be at least 60% the absolute stereoisomer depicted. In another embodiment, the compound may be at least 80% the absolute stereoisomer depicted. In another embodiment, the compound may be at least 90% the absolute stereoisomer depicted. In another embodiment, the compound may be at least 95 the absolute stereoisomer depicted. In another embodiment, the compound may be at least 99% the absolute stereoisomer depicted.

The term "residue" as it applies to the residue of a compound refers to a compound that has been modified in any manner which results in the creation of an open valence wherein the site of the open valence. The open valence can be created by the removal of 1 or more atoms from the compound (e.g., removal of a single atom such as hydrogen or removal of more than one atom such as a group of atoms including but not limited to an amine, hydroxyl, methyl, amide (e.g., —C(=O)$NH_2$) or acetyl group). The open valence can also be created by the chemical conversion of a first function group of the compound to a second functional group of the compound (e.g., reduction of a carbonyl group, replacement of a carbonyl group with an amine,) followed by the removal of 1 or more atoms from the second functional group to create the open valence.

Specific values listed below for radicals, substituents, and ranges, are for illustration only; they do not exclude other defined values or other values within defined ranges for the radicals and substituents. It is to be understood that two or more values may be combined. It is also to be understood that the values listed herein below (or subsets thereof) can be excluded.

Specifically, ($C_2$-$C_{20}$)alkyl can be methyl, ethyl, propyl, isopropyl, butyl, iso-butyl, sec-butyl, pentyl, 3-pentyl, hexyl, heptyl, octyl, nonyl, decyl, undecyl, dodecyl, tridecyl, tetradecyl, pentadecyl, hexadecyl, heptadecyl, octadecyl, nonadecyl, or eicosanyl.

A specific value for $R^1$ is ($C_2$-$C_{18}$)alkyl.
A specific value for $R^1$ is ($C_2$-$C_{16}$)alkyl.
A specific value for $R^1$ is ($C_2$-$C_{14}$)alkyl.
A specific value for $R^1$ is ($C_2$-$C_{12}$)alkyl.
A specific value for $R^1$ is ($C_2$-$C_{10}$)alkyl
A specific value for $R^1$ is ($C_2$-$C_8$)alkyl
A specific value for $R^1$ is ($C_2$-$C_6$)alkyl
A specific value for $R^1$ is ($C_2$-$C_4$)alkyl.
A specific value for $R^1$ is ($C_4$-$C_{18}$)alkyl.
A specific value for $R^1$ is ($C_4$-$C_{16}$)alkyl.
A specific value for $R^1$ is ($C_4$-$C_{14}$)alkyl.
A specific value for $R^1$ is ($C_4$-$C_{12}$)alkyl.
A specific value for $R^1$ is ($C_4$-$C_{10}$)alkyl.
A specific value for $R^1$ is ($C_4$-$C_8$)alkyl.
A specific value for $R^1$ is ($C_4$-$C_6$)alkyl.
A specific value for $R^1$ is ($C_6$-$C_{18}$)alkyl.
A specific value for $R^1$ is ($C_6$-$C_{16}$)alkyl.
A specific value for $R^1$ is ($C_6$-$C_{14}$)alkyl.
A specific value for $R^1$ is ($C_6$-$C_{12}$)alkyl.
A specific value for $R^1$ is ($C_6$-$C_{10}$)alkyl.
A specific value for $R^1$ is ($C_6$-$C_8$)alkyl.

A specific value for $R^1$ is $(C_8\text{-}C_{18})$alkyl.
A specific value for $R^1$ is $(C_5\text{-}C_{16})$alkyl.
A specific value for $R^1$ is $(C_5\text{-}C_{14})$alkyl.
A specific value for $R^1$ is $(C_5\text{-}C_{12})$alkyl.
A specific value for $R^1$ is $(C_5\text{-}C_{10})$alkyl.
A specific value for $R^1$ is $(C_{10}\text{-}C_{18})$alkyl.
A specific value for $R^1$ is $(C_{10}\text{-}C_{16})$alkyl.
A specific value for $R^1$ is $(C_{10}\text{-}C_{14})$alkyl.
A specific value for $R^1$ is $(C_{10}\text{-}C_{12})$alkyl.
A specific value for $R^1$ is $(C_8)$alkyl.
A specific value for $R^1$ is $(C_9)$alkyl.
A specific value for $R^1$ is $(C_{10})$alkyl.
A specific value for $R^1$ is $(C_{11})$alkyl.
A specific value for $R^1$ is $(C_{12})$alkyl.
A specific value for $R^1$ is $C_5\text{-}C_{12}$ alkyl optionally substituted with one or more halo.
A specific value for $R^1$ is $C_9\text{-}C_{12}$ alkyl optionally substituted with one or more halo.
A specific value for $R^1$ is $C_{10}\text{-}C_{12}$ alkyl optionally substituted with one or more halo.
A specific value for $R^1$ is $C_8\text{-}C_{11}$ alkyl optionally substituted with one or more halo.
A specific value for $R^1$ is $C_9\text{-}C_{11}$ alkyl optionally substituted with one or more halo.
A specific value for $R^1$ is $C_{10}\text{-}C_{11}$ alkyl optionally substituted with one or more halo.
A specific value for $R^1$ is decyl, optionally substituted with one or more halo.
A specific value for $R^1$ is $C_9\text{-}C_{12}$.
A specific value for $R^1$ is $C_8\text{-}C_{11}$ alkyl.
A specific value for $R^1$ is $C_9\text{-}C_{11}$ alkyl.
A specific value for $R^1$ is $C_{10}\text{-}C_{11}$ alkyl.
A specific value for $R^1$ is octyl, nonyl, decyl, dodecyl, or hexadecyl.
A specific value for $R^1$ is 1-(n)-decyl.

Processes for preparing compounds of formula I are provided as further embodiments of the invention and are illustrated by the following procedures in which the meanings of the generic radicals are as given above unless otherwise qualified.

In cases where compounds are sufficiently basic or acidic, a salt of a compound of formula I can be useful as an intermediate for isolating or purifying a compound of formula I. Additionally, administration of a compound of formula I as a pharmaceutically acceptable acid or base salt may be appropriate. Examples of pharmaceutically acceptable salts are organic acid addition salts formed with acids which form a physiological acceptable anion, for example, tosylate, methanesulfonate, acetate, citrate, malonate, tartarate, succinate, benzoate, ascorbate, α-ketoglutarate, and α-glycerophosphate. Suitable inorganic salts may also be formed, including hydrochloride, sulfate, nitrate, bicarbonate, and carbonate salts.

Salts may be obtained using standard procedures well known in the art, for example by reacting a sufficiently basic compound such as an amine with a suitable acid affording a physiologically acceptable anion. Alkali metal (for example, sodium, potassium or lithium) or alkaline earth metal (for example calcium) salts of carboxylic acids can also be made.

The compounds of formula I can be formulated as pharmaceutical compositions and administered to a mammalian host, such as a human patient in a variety of forms adapted to the chosen route of administration, i.e., orally or parenterally, by intravenous, intramuscular, topical or subcutaneous routes.

Thus, the present compounds may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the active compound may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of a given unit dosage form. The amount of active compound in such therapeutically useful compositions is such that an effective dosage level will be obtained.

The tablets, troches, pills, capsules, and the like may also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the active compound may be incorporated into sustained-release preparations and devices.

The active compound may also be administered intravenously or intraperitoneally by infusion or injection. Solutions of the active compound or its salts can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various of the other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient present in the previously sterile-filtered solutions.

For topical administration, the present compounds may be applied in pure form, i.e., when they are liquids. However, it will generally be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver the compounds of formula I to the skin are known to the art; for example, see Jacquet et al. (U.S. Pat. No. 4,608,392), Geria (U.S. Pat. No. 4,992,478), Smith et al. (U.S. Pat. No. 4,559,157) and Wortzman (U.S. Pat. No. 4,820,508).

Useful dosages of the compounds of formula I can be determined by comparing their in vitro activity, and in vivo activity in animal models. Methods for the extrapolation of effective dosages in mice, and other animals, to humans are known to the art; for example, see U.S. Pat. No. 4,938,949.

The amount of the compound, or an active salt or derivative thereof, required for use in treatment will vary not only with the particular salt selected but also with the route of administration, the nature of the condition being treated and the age and condition of the patient and will be ultimately at the discretion of the attendant physician or clinician.

The desired dose may conveniently be presented in a single dose or as divided doses administered at appropriate intervals, for example, as two, three, four or more sub-doses per day. The sub-dose itself may be further divided, e.g., into a number of discrete loosely spaced administrations; such as multiple inhalations from an insufflator or by application of a plurality of drops into the eye.

The invention will now be illustrated by the following non-limiting Examples.

EXAMPLES

Experimental Procedures

All commercially available reagents were used without further purification. Anhydrous solvents were dried using routine protocols. All reactions were carried out under a nitrogen atmosphere in dry glassware with magnetic stirring. Column chromatography was conducted on 200-300 mesh silica gel. Analytical TLC was carried out by employing 0.25 mm silica gel plates (GF254) and visualization under UV light. NMR spectra were recorded on a Bruker 400 or Bruker 500 spectrometers. Chemical shifts are expressed in ppm, and J values are given in Hz.

All compounds evaluated for their biological effects were >95% pure. Chemicals employed for the bioassays, including ferrostatin-1 (Fer-1), liproxstatin-1 (Lip-1), RSL3 ((1S, 3R)-RSL3), erastin, α-tocopherol, carbonyl cyanide 4-(trifluoromethoxy) phenylhydrazone (FCCP) and galactose, were purchased from Sigma Aldrich. Fluorescent probes, including C11-BODIPY581/591(4,4-difluoro-5-(4-phenyl-1,3-butadienyl)-4-bora-3a,4a-diaza-s-indacene-3-propionic acid), and The Live/Dead® Viability/Cytotoxicity Kit were obtained from Invitrogen (Thermo Fisher Scientific). Luciferase-linked ATPase enzymatic assay (ViaLight Plus proliferation/cytoxicity kit was purchased from Lonza (Walkersville, MD). FRDA lymphocytes (catalogue number GM15850) and FRDA fibroblasts cells (catalogue number GM04078) were obtained from Coriell Cell Repositories (Camden, NJ, USA).

Lymphocytes were cultured in RPMI-1640 medium (Gibco, Life Technologies, Grand Island, NY) with 15% fetal calf serum, 2 mM glutamine (HyClone, South Logan, UT) and 1% penicillin-streptomycin antibiotic supplement (Cellgro, Manassas, VA). Cells were passaged daily to maintain them in log phase growth and kept at a nominal concentration of 5-10×105 mL. FRDA fibroblasts were cultured in 64% (v/v) Eagle's minimal essential medium (MEM), lacking phenol red with Eagle's balanced salt (EBS) and 25% M199 with EBS (Gibco) supplemented with 10% (v/v) fetal bovine serum albumin (HyClone), 1% penicillin-streptomycin antibiotic mix, 10 µg/mL insulin (Gibco), 10 ng/mL endothelial growth factor (EGF), 10 ng/mL basic fibroblast growth factor (Gibco) and 2 mM glutamine. Cells were grown in 75 cm2 culture flasks and incubated at 37° C. in a humidified atmosphere of 5% CO2 in air. Cells were fed twice weekly and split every third day at a ratio of 1:3. All experiments were conducted with FRDA cells from passages 8-14.

Example 1. Preparation of 8-Decyl-7-(dimethylamino)-3H-phenothiazin-3-One

To a stirred solution containing 110 mg (0.20 mmol) of N-(7-(dimethylamino)-3H-phenothiazin-3-ylidene-8-decyl)-N-methylmethanaminium iodide in 7 mL of 6:1 THF-H$_2$O was added 34.0 mg (0.60 mmol) of potassium hydroxide. The reaction mixture was stirred at room temperature for 30 min at which time the color of solution had changed from blue to red. The reaction mixture was quenched with water and extracted with two 20-mL portions of $CH_2Cl_2$. The combined organic phase was washed with brine, dried over $MgSO_4$, and the solvent was concentrated under diminished pressure. The residue was purified by flash chromatography on a silica gel column (10×2 cm). Elution with 10:1 hexane-EtOAc afforded the title compound as a red solid: yield 23.0 mg (29%); silica gel TLC Rf 0.5 (3:1 hexane-EtOAc); 1H NMR (CDCl3) δ 0.89 (t, 3H, J=6.9 Hz), 1.24-1.43 (m, 14H), 1.66-1.76 (m, 2H), 2.72 (t, 2H, J=7.5 Hz), 2.90 (s, 6H), 6.75 (s, 1H), 6.89 (dd, 1H, J=9.8, 2.2 Hz), 6.94 (s, 1H), 7.60 (d, 1H, J=9.8 Hz) and 7.71 (s, 1H); 13C NMR (CDCl$_3$) δ 14.1, 22.8, 29.4, 29.6, 29.7, 29.7, 29.8, 30.1, 31.6, 32.0, 43.9, 112.7, 119.0, 123.3, 133.7, 134.5, 135.3, 135.4, 136.3, 139.6, 143.1, 155.7 and 182.1; mass spectrum (ESI) m/z 397.2310 $[M+H]^+$ ($C_{24}H_{33}N_2OS$ requires 397.2308).

The intermediate N-(7-(dimethylamino)-3H-phenothiazin-3-ylidene-8-decyl)-N-methylmethanaminium iodide was prepared as follows.

a. Nonyltriphenylphosphonium Bromide

To a stirred solution containing 1.00 g (3.81 mmol) of triphenylphosphine in 30 mL of anhydrous toluene was added 728 μL (3.81 mmol) of 1-bromononane at room temperature. The reaction mixture was stirred at reflux overnight. The cooled reaction mixture was filtered, and the collected white precipitate was washed with an additional 20 mL of toluene and dried to afford the title compound as a white solid; yield 1.46 g (82%); silica gel TLC R$_f$ 0.4 (10:1 $CH_2Cl_2$-MeOH). This material was used directly without further purification.

b. tert-Butyl 2-Cyano-10H-phenothiazine-10-carboxylate

To a solution of 2.00 g. (8.90 mmol) of 2-cyanophenothiazine in in 25 mL of anhydrous DMF was added 536 mg (13.4 mmol, 60% in mineral oil) of $NaBH_4$ in an ice bath and the reaction mixture was stirred for an additional 30 min. A sample of 2.30 g (10.7 mmol) of di-tert-butyl-dicarbonate was then added. The reaction mixture was stirred at room temperature overnight, after which silica gel TLC analysis indicated the consumption of the starting material. The reaction mixture was quenched with 25 mL of saturated $NH_4Cl$, and then extracted with two 30-mL portions of $CH_2Cl_2$. The combined organic extract was washed with 20 mL of brine, dried over $MgSO_4$ and concentrated under diminished pressure to give the crude product. Purification by flash chromatography on a silica gel column (15×5 cm) afforded tert-butyl 2-cyano-10H-phenothiazine-10-carboxylate as a white solid: yield 2.20 g (75%); silica gel TLC R$_f$ 0.4 (3:1 hexane-EtOAc); $^1$H NMR (CDCl$_3$) δ 1.31 (s, 9H), 7.01 (td, 1H, J=7.6, 1.3 Hz), 7.09-7.16 (m, 2H), 7.22 (d, 2H, J=1.0 Hz), 7.31 (dd, 1H, J=8.0, 0.9 Hz) and 7.62 (t, 1H, J=1.0 Hz); $^{13}$C NMR (CDCl$_3$) δ 28.1, 83.2, 110.2, 118.2, 126.7, 127.3, 127.4, 127.5, 128.1, 129.2, 130.4, 130.7, 137.7, 139.0, 139.1 and 151.9.

c. tert-Butyl 2-Formyl-10H-phenothiazine-10-carboxylate

To a stirred solution of 1.00 g (3.10 mmol) of tert-butyl 2-cyano-10H-phenothiazine-10-carboxylate in 30 mL of anhydrous $CH_2Cl_2$ at −78° C. under a nitrogen atmosphere, was added dropwise 4.6 mL of a 1 M solution in toluene (4.6 mmol) of DiBAl-H and the resulting reaction mixture was stirred at −78° C. for 3 h. Silica gel TLC analysis indicated the consumption of starting material, and the reaction mixture was diluted with $CH_2Cl_2$, washed successively with $H_2O$ and brine, then dried over $MgSO_4$, filtered, and concentrated under diminished pressure to afford the crude product. The crude residue was purified by flash chromatography (10×5 cm column), elution with 10:1 hexane-EtOAc, to give tert-butyl 2-formyl-10H-phenothiazine-10-carboxylate as a yellow solid: yield 850 mg (85%); silica gel TLC R$_f$ 0.5 (3:1 hexane-EtOAc); $^1$H NMR (CDCl$_3$) δ 1.43 (s, 9H), 7.12 (td, 1H, J=7.6, 1.3 Hz), 7.25 (ddd, 2H, J=15.6, 7.9, 1.5 Hz), 7.40 (d, 1H, J=8.0 Hz), 7.46 (dd, 1H, J=8.1, 1.2 Hz), 7.60 (dd, 1H, J=8.0, 1.7 Hz), 7.95 (d, 1H, J=1.6 Hz) and 9.91 (s, 1H); $^{13}$C NMR (CDCl$_3$) δ 28.1, 82.8, 126.5, 126.6, 127.1, 127.3, 127.5, 127.9, 128.4, 130.5, 135.1, 138.0, 139.1, 140.3, 152.1 and 190.9.

d. tert-Butyl (E)-2-(Dec-1-en-1-yl)-10H-phenothiazine-10-carboxylate

To a stirred solution containing 108 mg (0.23 mmol) of (1-nonyl)triphenylphosphonium bromide in 5 mL of anhydrous THF cooled under argon at −78° C. and kept for 15 min, was added dropwise 0.30 mL (0.30 mmol) of a 1 M solution of NaHMDS in THF. The resulting reaction mixture was stirred in an ice bath for an additional 3 h. After this time, the reaction mixture was cooled to −78° C., and a solution containing 50.0 mg (0.15 mmol) of tert-butyl 2-formyl-10H-phenothiazine-10-carboxylate in 2 mL of anhydrous THF was added dropwise. Stirring was continued for a further 18 h at 0° C. The reaction was quenched by adding 5 mL of saturated NH₄Cl, and extracted with two 20-mL portions of CH₂Cl₂. The combined organic phase was washed with brine, dried over MgSO₄, and the solvent was concentrated under diminished pressure. The residue was purified by flash chromatography on a silica gel column (10×2 cm), elution with 150:1 hexane-EtOAc to afford tert-butyl (E)-2-(dec-1-en-1-yl)-10H-phenothiazine-10-carboxylate as a white solid: yield 51.1 mg (78%); silica gel TLC $R_f$ 0.5 (20:1 hexane-EtOAc); $^1$H NMR (CDCl₃) δ 0.96 (t, 3H, J=5 Hz, 3H), 1.25-1.53 (m, 12H), 1.57 (s, 9H), 2.41 (q, 2H, J=6.6 Hz), 5.72-5.76 (m, 1H), 6.43 (d, 1H, J=11.6 Hz), 7.13-7.19 (m, 2H), 7.22-7.30 (m, 2H), 7.37 (d, 1H, J=10 Hz), 7.54 (s, 1H) and 7.60 (d, 1H, J=7.9 Hz); 13C NMR (CDCl3) δ 14.2, 22.8, 28.3, 28.8, 29.4, 29.5, 29.6, 30.1, 32.0, 82.0, 126.1, 126.5, 126.7, 127.0, 127.4, 127.5, 127.6, 127.9, 130.1, 132.3, 133.9, 136.7, 138.6, 138.9 and 152.5; mass spectrum (ESI) m/z 438.2 (M+H)⁺ (theoretical m/z 438.2).

e. tert-Butyl 2-Decyl-10H-phenothiazine-10-carboxylate

A solution containing 524 mg (1.20 mmol) of tert-butyl (E)-2-(dec-1-en-1-yl)-10H-phenothiazine-10-carboxylate in 30 mL of 7:3 EtOH-CH₂Cl₂ was purged with argon for 20 min. To the resulting solution was added 125 mg of 10% palladium-on-carbon. The suspension was stirred at room temperature under a hydrogen atmosphere (40 psi) for 3 h. The reaction mixture was filtered through a Celite pad and the filtrate was concentrated under diminished pressure. The crude product was obtained in quantitative yield and was used for the next reaction without further purification.

f. 2-Decyl-10H-phenothiazine

To a stirred solution containing 219 mg (0.50 mmol) of tert-butyl 2-decyl-10H-phenothiazine-10-carboxylate in 15 mL of anhydrous CH₂Cl₂ was added dropwise 300 μL (4.00 mmol) of trifluoroacetic acid at room temperature under nitrogen protection. The reaction mixture was stirred for 4 h. The reaction was then neutralized with 5 mL of saturated NaHCO₃ and extracted with 20 mL of CH₂Cl₂. The organic phase was washed with brine, dried with MgSO₄, and concentrated under diminished pressure. The crude product was used for the next step without further purification.

g. N-(7-(Dimethylamino)-3H-phenothiazin-3-ylidene-8-decyl)-N-methylmethanaminium Iodide

Compound 6

To a stirred solution containing 169 mg (0.50 mmol) of 2-decyl-10H-phenothiazine in 15 mL of anhydrous CH₂Cl₂ was added 380 mg (1.50 mmol) of iodine and the reaction mixture was stirred for 30 min in the dark. A solution containing 1.00 mL (2.00 mmol) of 2 M dimethylamine in THF was added dropwise, and the resulting mixture was stirred at room temperature for another 4 h. The reaction mixture was concentrated under diminished pressure to give the crude product. The residue was purified by flash chromatography on a silica gel column (15×5 cm). Elution with 30:1 CH₂Cl₂-MeOH afforded N-(7-(dimethylamino)-3H-phenothiazin-3-ylidene-8-decyl)-N-methylmethanaminium iodide as a blue solid: yield 55.1 mg (20% for two steps); silica gel TLC $R_f$ 0.4 (10:1 CH₂Cl₂-MeOH); $^1$H NMR (CDCl₃) δ 0.67 (t, 3H, J=5.6 Hz), 1.05-1.25 (m, 14H), 1.46-1.55 (m, 2H), 2.62-2.73 (m, 2H), 3.20 (s, 6H), 3.33 (s, 6H), 7.11-7.25 (m, 2H), 7.51-7.67 (m, 2H) and 8.52 (s, 1H); $^{13}$C NMR (CDCl₃) δ 14.1, 22.5, 29.1, 29.3, 29.4, 30.1, 31.7, 33.9, 35.0, 35.1, 42.8, 44.8, 106.9, 111.0, 120.1, 131.3, 135.0, 136.6, 136.9, 137.0, 138.3, 138.7, 153.8 and 157.6; mass spectrum (ESI) m/z 424.2790 [M−I]⁺ (C₂₆H₃₈N₃S requires m/z 424.2781).

Examples 2-5

Using a procedure similar to that described in Example 1, except replacing 1-nonyl)triphenylphosphonium bromide in step d with the requisite (alkyl) triphenylphosphonium bromide, the compounds of Examples 2-5 were prepared.

Example 2. Preparation of 7-(Dimethylamino)-8-octyl-3H-phenothiazin-3-one To a stirred solution containing 100 mg (0.19 mmol) of N-(7-(dimethylamino)-3H-phenothiazin-3-ylidene-8-octyl)-N-methylmethanaminium iodide in 7 mL of 6:1 THF-H₂O was added 34.0 mg (0.60 mmol) of potassium hydroxide. The reaction mixture was stirred at room temperature for 30 min at which time the color of the solution had changed from blue to red. The reaction mixture was quenched with water and extracted with two 20-mL portions of CH$_2$Cl$_2$. The combined organic extract was washed with brine, dried over MgSO$_4$, and the solvent was concentrated under diminished pressure to give the crude product. The crude product was purified by flash chromatography on a silica gel column (10×2 cm). Elution with 10:1 hexane-EtOAc afforded 7-(dimethylamino)-8-octyl-3H-phenothiazin-3-one as a red solid: yield 14 mg (20%); silica gel TLC R$_f$ 0.4 (3:1 hexane-EtOAc); 1H NMR (CDCl$_3$) δ 0.89 (t, 3H, J=6.9 Hz), 1.26-1.40 (m, 10H), 1.69-1.73 (m, 2H), 2.-2.73 (m, 2H), 2.90 (s, 6H), 6.75 (d, 1H, J=2.1 Hz), 6.91 (dd, 1H, J=9.8, 2.1 Hz), 6.94 (s, 1H), 7.60 (d, 1H, J=9.8 Hz) and 7.72 (s, 1H); $^{13}$C NMR (CDCl$_3$) δ 14.1, 22.7, 29.2, 29.4, 29.7, 30.0, 31.5, 31.9, 43.9, 112.7, 119.0, 123.3, 133.7, 134.5, 135.3, 135.4, 136.3, 139.6, 143.1, 155.7 and 182.1; mass spectrum (ESI) m/z 369.2002 [M+H]$^+$ C$_{22}$H$_{29}$N$_2$OS requires m/z 369.1995).

Example 3. Preparation of 7-(Dimethylamino)-8-nonyl-3H-phenothiazin-3-one

To a stirred solution containing 107 mg (0.20 mmol) of N-(7-(dimethylamino)-3H-phenothiazin-3-ylidene-8-nonyl)-N-methylmethanaminium iodide in 7 mL of 6:1 THF-H$_2$O was added 34.0 mg (0.60 mmol) of potassium hydroxide. The reaction mixture was stirred at room temperature for 30 min at which time the color of the solution had changed from blue to red. The reaction mixture was quenched with water and extracted with two 20-mL portions of CH$_2$Cl$_2$. The combined organic extract was washed with brine, dried over MgSO$_4$, and the solvent was concentrated under diminished pressure. The residue was purified by flash chromatography on a silica gel column (10×2 cm). Elution with 10:1 hexane-EtOAc afforded 7-(dimethylamino)-8-nonyl-3H-phenothiazin-3-one as a red solid: yield 20.0 mg (26%); silica gel TLC R$_f$ 0.4 (3:1 hexane-EtOAc); $^1$H NMR (CDCl$_3$) δ 0.88 (t, 3H, J=6.9 Hz), 1.26-1.44 (m, 12H), 1.66-1.76 (m, 2H), 2.70 (t, 2H, J=7.5 Hz), 2.88 (s, 6H), 6.71 (d, 1H, J=2.1 Hz), 6.88 (dd, 1H, J=9.8, 2.1 Hz), 6.91 (s, 1H), 7.58 (d, 1H, J=9.8 Hz) and 7.69 (s, 1H); $^{13}$C NMR (CDCl$_3$) δ 14.1, 22.7, 29.3, 29.5, 29.6, 29.7, 29.9, 31.5, 31.9, 43.9, 112.6, 119.1, 123.2, 133.8, 134.4, 135.3, 135.4, 136.2, 139.5, 143.1, 155.7 and 182.2; mass spectrum (ESI) m/z 383.2159 [M+H]$^+$ (C$_{23}$H$_{31}$N$_2$OS requires m/z 383.2152).

Example 4. Preparation of 7-(Dimethylamino)-8-dodecyl-3H-phenothiazin-3-one

To a stirred solution containing 116 mg (0.20 mmol) of N-(7-(dimethylamino)-3H-phenothiazin-3-ylidene-8-dodecyl)-N-methylmethanaminium iodide in 7 mL of 6:1 THF-H$_2$O was added 34.0 mg (0.60 mmol) of potassium hydroxide. The reaction mixture was stirred at room temperature for 30 min at which time the color of solution had changed from blue to red. The reaction mixture was quenched with water and extracted with two 20-mL portions of CH$_2$Cl$_2$. The combined organic phase was washed with brine, dried over MgSO4, and the solvent was concentrated under diminished pressure. The residue was purified by flash chromatography on a silica gel column (10×2 cm). Elution with 10:1 hexane-EtOAc afforded 7-(dimethylamino)-8-dodecyl-3H-phenothiazin-3-one as a red solid: yield 28.8 mg (34%); silica gel TLC R$_f$ 0.5 (3:1 hexane-EtOAc); $^1$H NMR (CDCl$_3$) δ 0.87 (t, 3H, J=6.9 Hz), 1.25-1.43 (m, 18H), 1.70 (dt, 2H, J=15.6, 7.7 Hz), 2.67-2.75 (m, 2H), 2.88 (s, 6H), 6.71 (d, 1H, J=2.2 Hz), 6.88 (dd, 1H, J=9.8, 2.2 Hz), 6.91 (s, 1H), 7.57 (d, 1H, J=9.8 Hz) and 7.69 (s, 1H); $^{13}$C NMR (CDCl$_3$) δ 14.1, 22.7, 29.4, 29.4, 29.5, 29.6, 29.7, 29.7, 29.7, 30.0, 31.5, 31.9, 43.9, 112.7, 119.1, 123.2, 133.8, 134.4, 135.3, 135.3, 136.3, 139.6, 143.1, 155.7 and 182.3; mass spectrum (ESI-MS) m/z 425.2627 [M+H]$^+$ (C$_{26}$H$_{37}$N$_2$OS requires m/z 425.2621).

Example 5. Preparation of 7-(Dimethylamino)-8-hexadecyl-3H-phenothiazin-3-one

To a solution containing 310 mg (0.61 mmol) of N-(7-(dimethylamino)-3H-phenothiazin-3-ylidene-8-decyl)-N-methylmethanaminium iodide in 8 mL of 6: 1 tetrahydrofuran-water was added 40.0 mg (0.61 mmol) of potassium hydroxide. The reaction mixture was stirred at 25° C. for 30 min at which time the solution had changed from green to red in color. The reaction mixture was then quenched with 15 mL of water. The product was extracted with two 20 mL portions of ethyl acetate. The organic phase was washed with 15 mL of brine, dried over Na$_2$SO$_4$ and concentrated under diminished pressure. The residue was purified by flash chromatography on a silica gel column (20×1 cm) (100: 0→0: 100 hexane/EtOAc) to afford 7-(dimethylamino)-8-hexadecyl-3H-phenothiazin-3-one as a violet solid: yield 10 mg (5%); silica gel TLC R$_f$ 0.65 (1: 1 hexane-ethyl acetate); $^1$H NMR (500 MHz, CDCl$_3$) δ 0.87 (t, 3H, J=7.5 Hz), 1.25 (s, 26H), 1.59 (s, 1H), 1.70 (m, 2H), 2.70 (t, 2H, J=7.5 Hz), 2.88 (s, 5H), 6.72 (d, 1H, J=2 Hz), 6.88 (dd, 1H, J=5 Hz), 6.92 (s, 1H), 7.58 (d, 1H, J=10 Hz) and 7.70 (s, 1H); $^{13}$C NMR (125 MHz, CDCl$_3$) δ 14.2, 22.8, 29.5, 29.6, 29.7, 29.81, 29.85, 30.1, 31.6, 32.0, 44.0, 112.8, 119.2, 123.3, 134.0, 134.5, 136.4, 139.7, 143.3, 155.8 and 182.4; UV-vis (λmax) 545 nm (CH$_2$Cl$_2$), 566 nm (MeOH); HRMS (APCI), m/z 481.3250 (M+H)$^+$ (C$_{30}$H$_{45}$N$_2$OS requires m/z 481.3253).

Example 6. Assessment of Lipid Peroxidation

Lipid peroxidation in live cells can be visualized using the oxidation-sensitive fluorescent probe C11-BODIPY581/591. Upon oxidation of this probe, the fluorescence properties shift from a red-emitting form (595 nm) to a green emitting form (520 nm). Changes in fluorescence indirectly reflect the oxidation of unsaturated fatty acids. A quantitative analysis of lipid peroxidation in FRDA lymphocytes, challenged with 2 µM RSL3 in the presence or absence of the test compounds for 2 h was obtained by FACS analysis using the specific dye C11-BODIPY581/591. Briefly, FRDA lymphocytes (5×105 cell/mL) were treated with the test compounds (dissolved in DMSO and added to the assay medium at final DMSO concentrations <0.5%) at varying concentrations and incubated at 37° C. overnight in a humidified atmosphere containing 5% CO2 in air. Cells were treated with 2 µM of RSL3 and then incubated for 90 minutes in a humidified atmosphere containing 5% CO2 in air at 37° C. Cells were treated with 2 µM of C11-BODIPY581/591 in phenol red-free RPMI-1640 media and incubated at 37° C. in the dark for 30 min. Treated cells were collected by centrifugation at 300×g for 3 min and then washed with phosphate buffered saline (PBS). Cells were resuspended in 300 µL of PBS and were analyzed immediately by flow cytometry (C6 Accuri, BD Biosciences, San Jose, CA), to monitor the change in intensity of the C11-BODIPY581/591-green (oxidized) fluorescence signal using 488 nm excitation laser and FL1-H channel 538 nm emission filter. In each analysis, 10,000 events were recorded. The experiments shown are representative of at least two independent experiments. Final data output was a calculated EC50 value determined graphically from the dose-response curves using the nonlinear regression curve fit analysis model. Data for the compounds of Examples 1-5 is provided in the following table.

| Example | RSL3 challenge lipid peroxidation inhibition EC$_{50}$ (nM) |
|---|---|
| 1 | 9 ± 1 |
| 2 | 14 ± 1 |
| 3 | 12 ± 1 |
| 4 | 16 ± 1 |
| 5 | 25 ± 3 |

Example 7. Erastin Cell Survival Assay (FRDA Fibroblasts)

The ability of the test compounds to confer cytoprotection to ferroptosis inducer erastin in FRDA fibroblasts was determined by assessing the depletion of cellular ATP using a commercially available luciferase-linked ATPase enzymatic assay (ViaLight® Plus proliferation/cytotoxicity Kit (Lonza, Walkersville, MD) according to the directions of the manufacturer. Briefly, FRDA fibroblasts (GM04078) were plated in 96-well microtiter plates at a density of 3000 cell/well (50 µL) (Costar, Corning, NY). The plates were incubated at 37° C. for 24 h in an atmosphere having 95% humidity and 5% CO2 to allow attachment of the cells to the culture plates and to allow the cell density reach 60-70% confluency. The next day the test compounds were dissolved in DMSO, diluted to the appropriate concentrations in fresh cell culture media and the cells were then treated with the test compounds (final DMSO concentration was <0.5%). Twelve hours later, 50 µL of erastin solution in culture medium were added to the wells, resulting in 4 µM final concentration. Cell viability in each well was determined 48 h after erastin addition by measuring the intracellular ATP content using the ViaLight®-Plus ATP monitoring reagent kit (Lonza, Walkersville, MD) according to the manufacturer's protocol. The ATP concentration was determined by reading luminescence using a luminator (Clarity™ luminescence microplate reader). The percent of viable cells relative to non-treated control was determined for each well. The experiments shown are representative of at least two independent experiments. Final data output was a calculated EC50 value determined graphically from the dose-response curves using the nonlinear regression curve fit analysis model. Data for the compounds of Examples 1-5 is provided in the following table.

| Example | Erastin challenge cell survival EC50 (nM) |
|---|---|
| 1 | 10 ± 1 |
| 2 | 15 ± 3 |
| 3 | 11 ± 1 |
| 4 | 15 ± 1 |
| 5 | 22 ± 2 |

Example 8. Measurement of Cellular ATP Concentration

Figure 1:
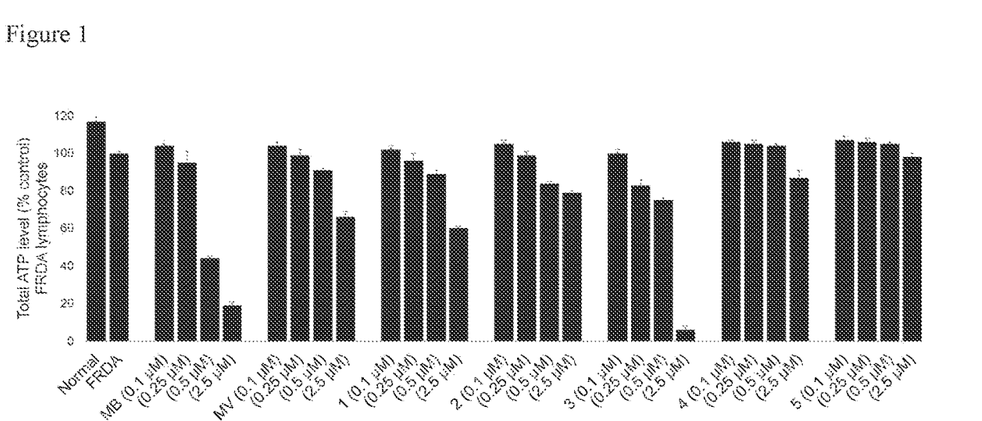
FIG. 1. Shows total ATP levels in FRDA lymphocytes following incubation with test compounds for 24 hours in glucose free media (25 mM galactose) to force the cell to employ OXPHOS. Results are expressed as percentage of total ATP relative to untreated control. See Example 8.

The total cellular ATP levels in FRDA lymphocytes were measured using a commercially available luciferase-linked ATPase enzymatic assay (ViaLight Plus proliferation/cytotoxicity Kit (Lonza, Walkersville, MD) according to the manufacturer's directions. Briefly, lymphocytes (2×105 cell/mL) were plated (1 mL) in 24-well plates, treated with the test compounds (dissolved in DMSO and added to the assay medium at final DMSO concentrations <0.5%) at final compound concentrations of 0.1, 0.25, 0.5 and 2.5 µM, and then incubated at 37° C. for 24 h in a humidified atmosphere containing 5% CO2 in air. Cells in each well were mixed and transferred (100 µL) to 96-well microtiter white-walled cell culture plates (Costar, Corning, NY). The total intracellular ATP level was measured in a luminator (Clarity™ luminescence microplate reader) using an ATP Bioluminescence Assay Kit (ViaLight®-Plus ATP monitoring reagent kit, Lonza) following the manufacturer's protocol. The total ATP level was expressed as a percentage of untreated control. Data are reported as the mean of at least three independent experiments. Data for the compounds of Examples 1-5 is provided in FIG. 1.

Example 9. Mitochondrial Membrane Potential (Δψm) Assay

Figure 2:
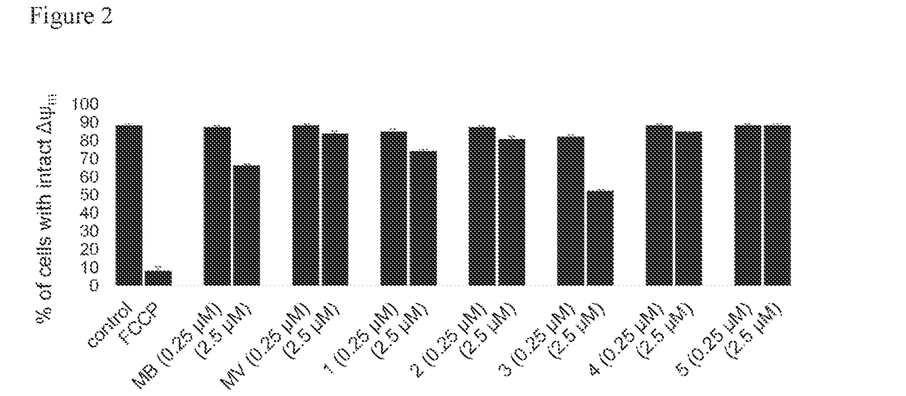
FIG. 2. Shows the effects of the compounds of Examples 1-5 on $\Delta\psi_m$ in FRDA lymphocytes using the ratiometric fluorescent marker JC-1. Flow cytometric determination of depolarized $\Delta\psi_m$ using the ratiometric fluorescent probe JC-1. The actual percentage of cells with intact $\Delta\psi_m$ were extracted from a two-dimensional color density dot blot. Results obtained were verified by running duplicates in two independent runs. See Example 9.

The lipophilic dye cationic dye, JC-1, was used to evaluate the mitochondrial potential. JC-1 displays membrane potential-dependent accumulation in the mitochondria and has dual-fluorescent properties being red as aggregates and green as monomers. This probe provides a simple, fluorescence-based method for distinguishing between healthy and apoptotic cells. Changes in Δψm were assessed by flow cytometry as described before. Briefly, FRDA lymphocytes cells (5×10^5 cells) were pretreated with or without the test compounds for 16 h. The cells were incubated at 37° C. in the dark for 20 min with 1 μM JC-1. Cells were collected by centrifugation at 300×g for 3 min and washed with PBS. The cells were resuspended in PBS supplemented with 20 mM glucose and were analyzed immediately by flow cytometry using a 488 nm excitation laser and the FL1-H channel 530±15 nm emission filter and the FL2-H channel 585±15 nm emission filter. For each analysis, 10,000 events were recorded and analyzed using C6 Accuri software. FCCP (carbonyl cyanide p-trifluoromethoxyphenyl hydrazone), a mitochondrial uncoupler, was used to produce a negative control. Results expressed as the percentage of cells with intact Δψm were verified by running duplicates and repeating each experiment as a second independent experiment. Data for the compounds of Examples 1-5 is provided in FIG. 2.

Example 10. Cytotoxicity Assay

Figure 3:
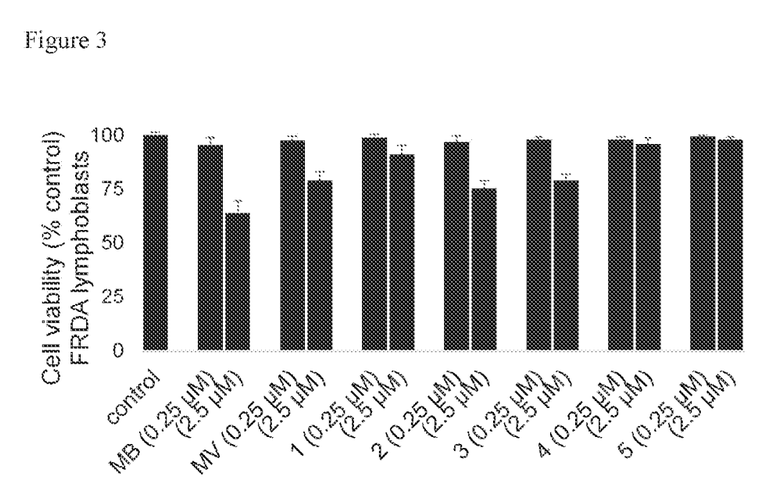
FIG. 3. Shows the cytotoxicity of the compounds of Examples 1-5 toward cultured FRDA lymphocytes after incubation for 24 hours in glucose-free (galactose) media to force the cells to rely on mitochondrial ATP production. Flow cytometric determination of cell viability by dual fluorescence labeling employed calcein-AM and ethidium homodimer-1 as live and dead stains, respectively. The actual percentage of live cells were extracted from a two-dimensional color density dot blot. Results obtained were verified by running duplicates in two independent experiments. See Example 10.

MB/MV analogues were tested for their cytotoxicity in FRDA lymphocytes using simultaneous staining with a two-color fluorescence assay, the Live/Dead® Viability/Cytotoxicity Kit (Molecular Probes). Briefly, one mL of FRDA lymphocyte cells (5×10^5 cells) were plated in a 24-well plate in glucose free media (galactose 25 mM), treated with the test compounds and incubated at 37° C. for 24 h or 48 h in a humidified atmosphere containing 5% CO2 in air. Cells were collected by centrifugation at 300×g for 3 min and washed with phosphate buffered saline. Cells were resuspended in phosphate buffered saline containing 25 mM galactose. The cell suspension was stained with 0.1 μM calcein AM and 0.2 μM EthD-1 and incubated in the dark at 37° C. for 15 min. Cells were collected by centrifugation at 300×g for 3 min and then washed with phosphate buffered saline (PBS). The samples were analyzed immediately by flow cytometry (C6 Accuri, BD Biosciences, San Jose, CA), using a 488 nm excitation laser and the FL1-H channel 530±15 nm emission filter and the FL2-H channel 585±15 nm. For each analysis 10,000 events were recorded and analyzed using C6 Accuri software (BD Biosciences). The results obtained were verified by running duplicates and repeating experiments in two independent experiments. Data for the compounds of Examples 1-5 is provided in FIG. 3.

Example 11. p-AMPK/AMPK Ratio Western Blot Analysis

HepG2 cells were seeded at a density of 500,000 cells per/mL (5 mL) in T-25 flask and incubated at 37° C. overnight in a humidified atmosphere containing 5% CO2 in air. On the following day cultures were treated with the test compounds and incubated for an additional 24 hours. Cells were detached and harvested by centrifugation, washed with saline buffer and the pellets were then lysed using 1X RIPA buffer (50 mM Tris-HCl (pH 7.5), 150 mM NaCl, 1% Nonidet P-40, 0.5% sodium deoxycholate, 0.1% SDS) supplemented with NaVO4, and protease inhibitor cocktail (Roche Applied Science), phosphatase inhibitor cocktail (PhoSTOP, Roche) and 1 mM phenylmethylsulfonyl fluoride (Sigma), and incubated on ice for 30 min with periodic mixing and two flash freeze cycles. These samples were cleared of insoluble material by centrifugation at 15,000×g for 10 min at 4° C. Total protein concentration was measured using a BCA kit (Thermo Fisher Scientific). NuPAGE LDS Sample Buffer (4X) and NuPAGE Reducing Agent (10X) was added to the lysate which was denatured at 70° C. for 5 min, then equal amounts of lysates (20 μg) were used for immunoblotting. Samples were resolved on a 4%-12% SDS-polyacrylamide Bis-Tris gels (Invitrogen) according to the manufacturer's recommendations and then proteins were transferred to PVDF membranes.

Figure 4A:
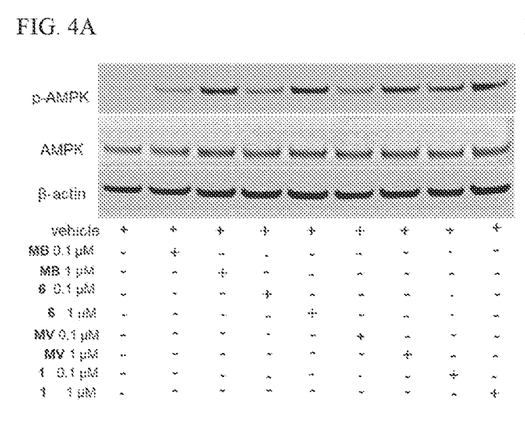
FIG. 4A shows the protein expression levels of AMPK, p-AMPK and 3-actin (loading control) were determined using western blot analysis in HepG2 cells following treatment with or without MB, MV, Example 1, and Compound 6.
Figure 4B:
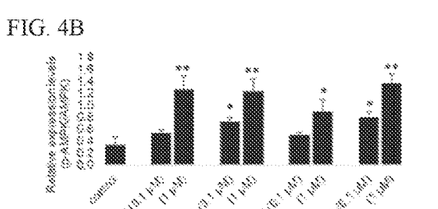
FIG. 4B shows Quantification of p-AMPK/AMPK protein expression. Experiments were performed in triplicate and data are expressed as mean±SEM (* $p<0.05$ and ** $p<0.01$ as compared to control. Statistical analysis was performed using an unpaired, two-tailed t test.
Figure 4C:
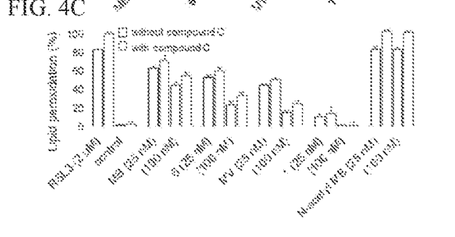
FIG. 4C shows Antiferroptotic effects of representative compounds in FRDA lymphocytes against RSL3-induced lipid peroxidation in the presence and absence of AMPK inhibitor compound C (10 µM). See Example 11.

After blocking with Superblock-TBS (Thermo Fisher Scientific) for 1 hour at room temperature, the primary antibodies against AMPKα phosphorylated at Thr172 (#2535), AMPKα (#2603), (all from Cell Signaling Technology, Beverly, MA, USA); β-actin (sc08432), (Santa Cruz Biotechnology, Dallas, TX, USA) were diluted with the corresponding primary anti-blocking solution and incubated at 4° C. overnight with the membranes. Following three 10-min washes with Tris-buffered saline (TBST), the blots were incubated with horseradish peroxidase-linked secondary antibody IgGs (Cell Signaling Technology) at room temperature for 1 hour. The blots were washed three times for 10 min with TBST, rinsed with deionized H2O, and developed with enhanced chemiluminescence (ECL) (Azure Biosystem) using West Pico Chemiluminescent Substrate (Pierce Biotechnology). The Western blotting results were analyzed by grayscale scanning using AzureSpot software. Data for the compound of Example 1 is provided in FIG. 4.

Example 12. The Following Illustrate Representative Pharmaceutical Dosage Forms, Containing a Compound of Formula I ('Compound X'), for Therapeutic or Prophylactic Use in Humans

| (i) Tablet 1 | mg/tablet |
|---|---|
| Compound X= | 100.0 |
| Lactose | 77.5 |
| Povidone | 15.0 |
| Croscarmellose sodium | 12.0 |
| Microcrystalline cellulose | 92.5 |
| Magnesium stearate | 3.0 |
| | 300.0 |

| (ii) Tablet 2 | mg/tablet |
|---|---|
| Compound X= | 20.0 |
| Microcrystalline cellulose | 410.0 |
| Starch | 50.0 |
| Sodium starch glycolate | 15.0 |
| Magnesium stearate | 5.0 |
| | 500.0 |

| (iii) Capsule | mg/capsule |
|---|---|
| Compound X= | 10.0 |
| Colloidal silicon dioxide | 1.5 |
| Lactose | 465.5 |
| Pregelatinized starch | 120.0 |
| Magnesium stearate | 3.0 |
| | 600.0 |

| (iv) Injection 1 (1 mg/ml) | mg/ml |
| --- | --- |
| Compound X = (free acid form) | 1.0 |
| Dibasic sodium phosphate | 12.0 |
| Monobasic sodium phosphate | 0.7 |
| Sodium chloride | 4.5 |
| 1.0N Sodium hydroxide solution (pH adjustment to 7.0-7.5) | q.s. |
| Water for injection | q.s. ad 1 mL |

| (v) Injection 2 (10 mg/ml) | mg/ml |
| --- | --- |
| Compound X = (free acid form) | 10.0 |
| Monobasic sodium phosphate | 0.3 |
| Dibasic sodium phosphate | 1.1 |
| Polyethylene glycol 400 | 200.0 |
| 1.0N Sodium hydroxide solution (pH adjustment to 7.0-7.5) | q.s. |
| Water for injection | q.s. ad 1 mL |

| (vi) Aerosol | mg/can |
| --- | --- |
| Compound X= | 20.0 |
| Oleic acid | 10.0 |
| Trichloromonofluoromethane | 5,000.0 |
| Dichlorodifluoromethane | 10,000.0 |
| Dichlorotetrafluoroethane | 5,000.0 |

The above formulations may be obtained by conventional procedures well known in the pharmaceutical art.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A compound of formula I:

or a pharmaceutically acceptable salt thereof, wherein: $R^1$ is $C_2$-$C_{20}$ alkyl optionally substituted with one or more halo.

2. The compound or pharmaceutically acceptable salt of claim 1, wherein $R^1$ is $C_8$-$C_{12}$ alkyl optionally substituted with one or more halo.

3. The compound or pharmaceutically acceptable salt of claim 1, wherein $R^1$ is $C_9$-$C_{12}$ alkyl optionally substituted with one or more halo.

4. The compound or pharmaceutically acceptable salt of claim 1, wherein $R^1$ is $C_{10}$-$C_{12}$ alkyl optionally substituted with one or more halo.

5. The compound or pharmaceutically acceptable salt of claim 1, wherein $R^1$ is $C_8$-$C_{11}$ alkyl optionally substituted with one or more halo.

6. The compound or pharmaceutically acceptable salt of claim 1, wherein $R^1$ is $C_9$-$C_{11}$ alkyl optionally substituted with one or more halo.

7. The compound or pharmaceutically acceptable salt of claim 1, wherein $R^1$ is $C_{10}$-$C_{11}$ alkyl optionally substituted with one or more halo.

8. The compound or pharmaceutically acceptable salt of claim 1, wherein $R^1$ is decyl, optionally substituted with one or more halo.

9. The compound or pharmaceutically acceptable salt of claim 1, wherein $R^1$ is $C_8$-$C_{12}$ alkyl.

10. The compound or pharmaceutically acceptable salt of claim 1, wherein $R^1$ is $C_9$-$C_{12}$ alkyl.

11. The compound or pharmaceutically acceptable salt of claim 1, wherein $R^1$ is $C_{10}$-$C_{12}$ alkyl.

12. The compound or pharmaceutically acceptable salt of claim 1, wherein $R^1$ is $C_8$-$C_{11}$ alkyl.

13. The compound or pharmaceutically acceptable salt of claim 1, wherein $R^1$ is $C_9$-$C_{11}$ alkyl.

14. The compound or pharmaceutically acceptable salt of claim 1, wherein $R^1$ is $C_{10}$-$C_{11}$ alkyl.

15. The compound or pharmaceutically acceptable salt of claim 1, wherein $R^1$ is octyl, nonyl, decyl, dodecyl, or hexadecyl.

16. The compound or pharmaceutically acceptable salt of claim 1, wherein $R^1$ is 1-(n)-decyl.

17. A pharmaceutical composition comprising a compound of formula I or a pharmaceutically acceptable salt thereof as described in claim 1, and a pharmaceutically acceptable excipient.

18. A method for treating or preventing a disease associated with decreased mitochondrial function resulting in diminished ATP production and/or oxidative stress and/or lipid peroxidation in an animal in need of such treating or preventing, comprising administering an effective amount of a compound of formula I or a pharmaceutically acceptable salt thereof as described in claim 1 to the animal.

19. A method for treating or suppressing a disease or condition selected from the group consisting of Friedreich's ataxia, Leber's hereditary optic neuropathy, Kearns-Sayre syndrome, mitochondrial encephalomyopathy with lactic acidosis and stroke-like episodes, and Leigh syndrome in an animal in need of such treating or suppressing, comprising administering an effective amount of a compound of formula I or a pharmaceutically acceptable salt thereof as described in claim 1 to the animal.

20. A method for treating or suppressing one or more diseases or conditions selected from the group consisting of obesity, atherosclerosis, amyotrophic lateral sclerosis, Parkinson's disease, cancer, heart failure, myocardial infarction (MI), Alzheimer's disease, Huntington's disease, schizophrenia, bipolar disorder, fragile X syndrome, chronic fatigue syndrome, and Leigh syndrome in an animal in need of such treating or suppressing, comprising administering an effective amount of a compound of formula I or a pharmaceutically acceptable salt thereof as described in claim 1 to the animal.

* * * * *